United States Patent
Lee

(10) Patent No.: US 7,076,100 B2
(45) Date of Patent: Jul. 11, 2006

(54) METHOD AND APPRARTUS THEREOF FOR DETECTING A HIDDEN IMAGE IN A HOLOGRAM

(75) Inventor: Yen-Chi Lee, Taipei (TW)

(73) Assignee: Hi-Touch Imaging Technologies Co., Ltd., Taipei Hsien (TW)

( * ) Notice: Subject to any disclaimer, the term of this patent is extended or adjusted under 35 U.S.C. 154(b) by 781 days.

(21) Appl. No.: 10/248,111

(22) Filed: Dec. 19, 2002

(65) Prior Publication Data

US 2004/0047507 A1 Mar. 11, 2004

(30) Foreign Application Priority Data

Sep. 5, 2002 (TW) ................................ 91120388 A

(51) Int. Cl.
*G06K 9/76* (2006.01)

(52) U.S. Cl. .......................... 382/210; 359/9; 359/35; 369/103; 369/44.37; 356/450

(58) Field of Classification Search ................ 382/210; 359/9, 11, 15, 19, 23, 24, 30, 32, 35, 569, 359/558; 369/103, 44.23, 44.12, 44.37; 365/125, 365/216; 430/1, 2; 356/450
See application file for complete search history.

(56) References Cited

U.S. PATENT DOCUMENTS

| | | | | |
|---|---|---|---|---|
| 4,776,652 A | * | 10/1988 | Ih | 359/16 |
| 5,410,397 A | * | 4/1995 | Toeppen | 356/121 |
| 5,583,843 A | * | 12/1996 | Horinouchi | 369/112.1 |
| 5,610,407 A | * | 3/1997 | Baba | 250/559.24 |
| 5,926,294 A | * | 7/1999 | Sato et al. | 359/22 |
| 6,064,586 A | * | 5/2000 | Snyder et al. | 365/125 |
| 6,339,562 B1 | * | 1/2002 | Sakai | 369/44.23 |
| 6,535,472 B1 | * | 3/2003 | Lee et al. | 369/103 |
| 6,721,076 B1 | * | 4/2004 | King et al. | 359/35 |

\* cited by examiner

*Primary Examiner*—Sheela Chawan
(74) *Attorney, Agent, or Firm*—Winston Hsu

(57) ABSTRACT

An apparatus for detecting a hidden image, which is formed in a first area of a hologram, is disclosed. The apparatus has a laser device for generating a laser beam and projecting the laser beam to the hologram, and a sensing device for sensing light that reflects from the hologram. When the laser beam is emitted to the hologram at a first incident angle, at least one diffractive beam is generated by diffraction of the laser beam. The sensing device is capable of outputting a responding signal according to the characteristics of the diffractive beam. Additionally, if the laser beam is emitted to the hologram at an incident angle, which is not equal to the first incident angle, the diffractive beam cannot be generated so that the sensing device does not output the responding signal.

12 Claims, 2 Drawing Sheets

METHOD AND APPRARTUS THEREOF FOR DETECTING A HIDDEN IMAGE IN A HOLOGRAM

BACKGROUND OF INVENTION

1. Field of the Invention

The present invention relates to a method and an apparatus thereof for detecting hidden images in a hologram, and more particularly to a method and an apparatus for anti-counterfeiting and identifying by using photography technology.

2. Description of the Prior Art

In the field of three-dimensional image technology, photography and holograms are respectively the most popular technologies and tools, making users able to three-dimensional images easily without using any specific auxiliary tools, and have been used in many fields, such as industry measurements, product advertisements, product packing, and ornaments etc., since a Nobel prize winner, Dr. Gabor, disclosed the photography in 1948.

Because the basic principles of the photography are interference and diffraction, the photography inherited the high precision characteristic of optical measurement. The photography, thus, is frequently adopted in many industrial or scientific measurements while the requests for highly accurate measurements grow rapidly.

SUMMARY OF INVENTION

It is therefore a primary objective of the claimed invention to provide a method and an apparatus for detecting a hidden image in a hologram by using the photography technology to provide anti-counterfeiting and identifying effects.

The hidden image is formed in a first area of the hologram. The apparatus has a laser device for generating a laser beam and for projecting the laser beam to the hologram and a sensing device for sensing light that reflects from the hologram. When the laser beam is emitted to the first area at a first incident angle, at least a diffractive beam is generated by diffraction of the laser beam and the sensing device generates a first signal according to the characteristics of the diffractive beam. However, when the first laser beam is emitted to the first area at an incident angle that is not equal to the first incident angle, the diffractive beam cannot be generated and the sensing device does not generate the first signal.

By using the apparatus, it can be determined whether or not the hologram comprises the hidden image. Moreover, because the hidden image cannot be detected by the naked eye or by other non-specific tools, the disclosed method and apparatus can be used either in an anti-counterfeit field or in an identification field. For example, each of the present VISA credit cards usually comprises a hologram, which has a pattern of a dove, for anti-counterfeiting purposes. However, this anti-counterfeiting method is not strong enough because it is too easy to replicate the pattern in the hologram. If the method and the apparatus of the present invention are used to hide hidden images on the credit cards, the credit cards can be under a double anti-counterfeiting protection. On the other hand, the output signals are various if the hidden images on the hologram are different. The holograms with different hidden images, thus, can be used to identify and distinguish different objects or events.

These and other objectives and advantages of the present invention will no doubt become obvious to those of ordinary skill in the art after reading the following detailed description of the preferred embodiment that is illustrated in the various figures and drawings.

DETAILED DESCRIPTION

Figure 1:
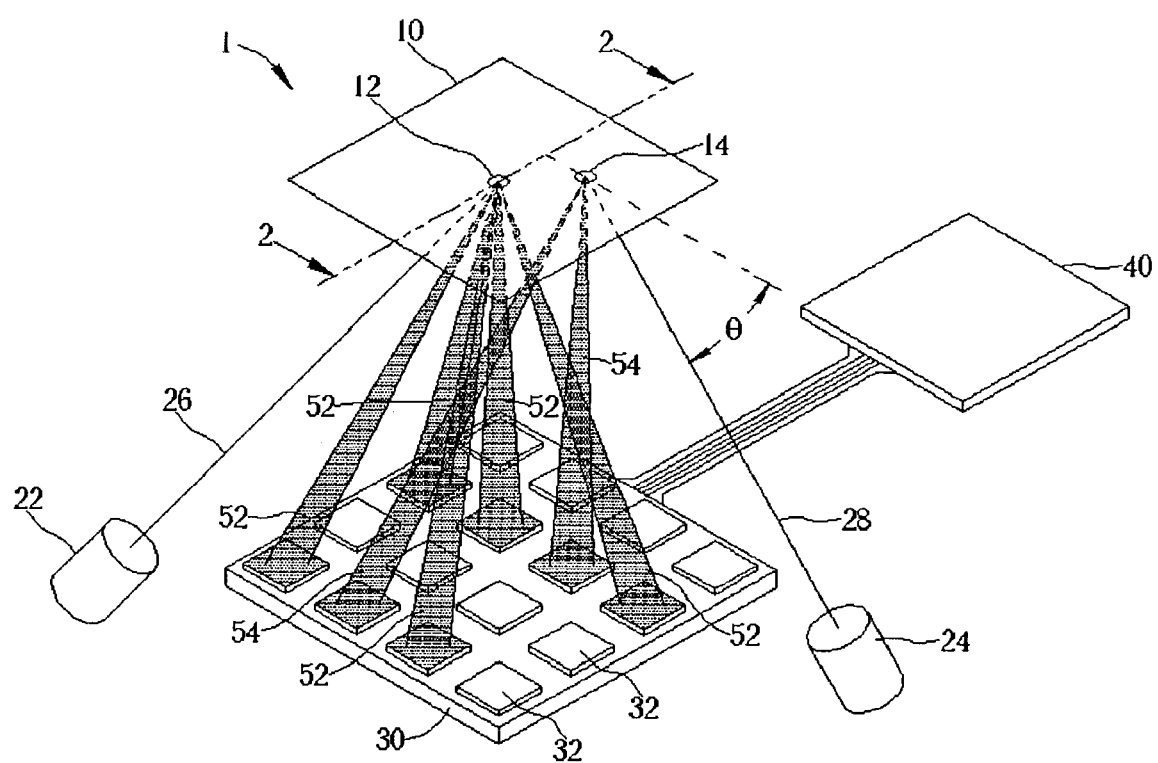
FIG. 1 is a schematic view of a hologram and an apparatus adopting the method of the present invention.
Figure 2:
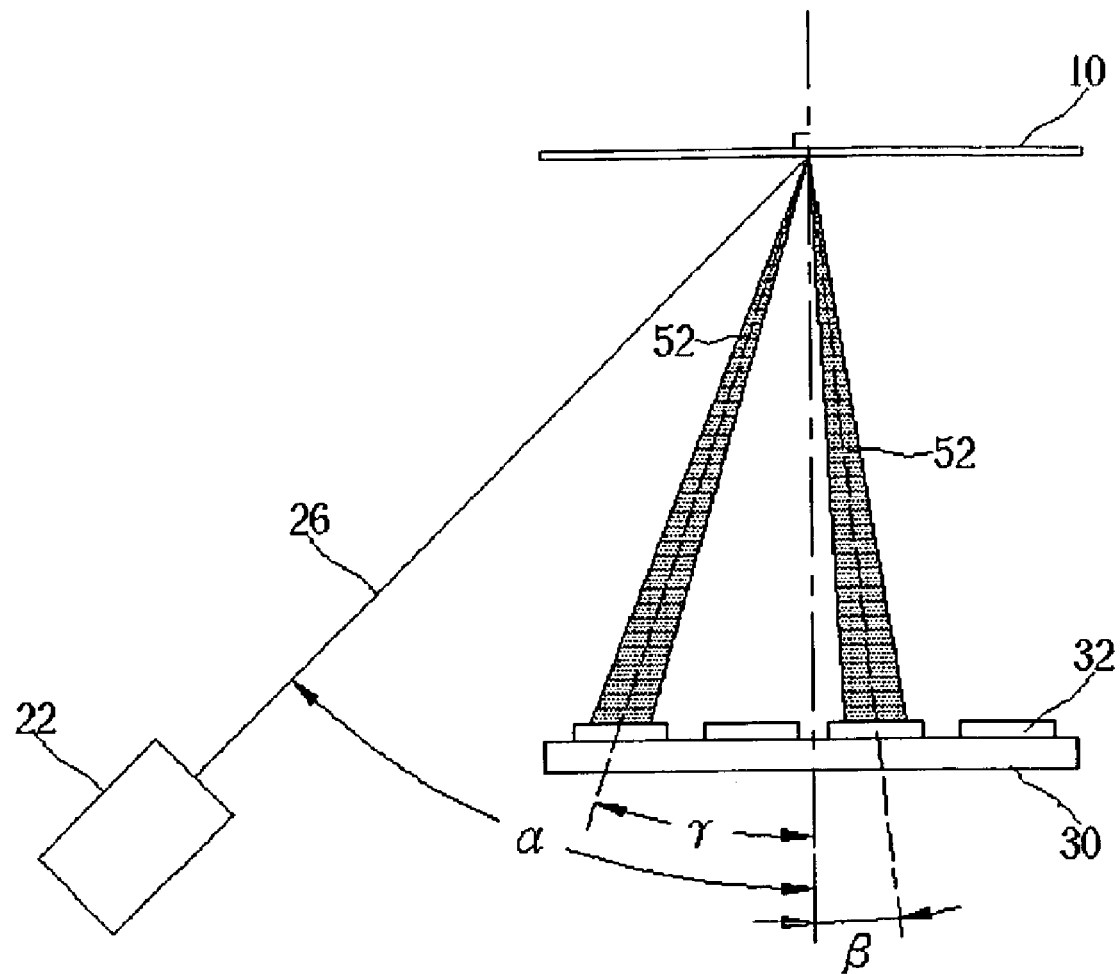
FIG. 2 is a cross-sectional diagram of the hologram and the apparatus along line 2—2 of FIG. 1.

Please refer to FIG. 1 and FIG. 2. FIG. 1 is a schematic view of a hologram 10 and an apparatus 1 adopting the method of the present invention. FIG. 2 is a cross-sectional diagram of the apparatus 1 and the hologram 10 along line 2—2 of FIG. 1. The apparatus 10 comprises a first laser device 22, a sensing device 30, and a logic circuit 40. The first laser device 22 is used to generate a first laser beam 26 and project the first laser beam 26 onto the hologram 10. A first hidden image (not shown) is formed in a first area 12 of the hologram 10 and cannot be seen by the naked eye. The sensing device 30 is a charge-coupled device (CCD) or a light sensor, that is used to sense reflected light from the hologram 10 and to generate corresponding signals according to the reflected light. The sensing device 30 comprises a plurality of sensing units 32 arranged on the surface of the sensing device 30 for detecting the reflected light projected on various areas of the surface of the sensing device 30. The logic circuit 40 is electrically connected to an output terminal of the sensing device 30 and is used to analyze the signals received from the sensing device 30.

A plurality of optical gratings for interference and diffraction are formed on the hologram 10. When the first laser beam 26 is emitted to the first area 12 at a first incident angle $\alpha$, at least a first diffractive beam 52 is generated by diffraction of the first laser beam 26. The first diffractive beams 52 are projected to the sensing device 30, and then the sensing device 30 generates a first signal according to the characteristics of the first diffractive beams 52. The first signal is transmitted to the logic circuit 40 for analysis. After the logic circuit 40 analyzes the first signal, it can be determined whether the first hidden image formed in the first area 12 agrees with a predetermined standard.

Moreover, because of the characteristics of the hologram 10, if the first laser beam 26 is emitted to the first area 12 at an incident angle that is not equal to the first incident angle $\alpha$, the first diffractive beam 52 cannot be generated and the sensing device 30 does not generate the first signal. In this situation, the apparatus 1 cannot detect the first hidden image of the hologram 10. Therefore, the first hidden image must be detected by emitting the first laser beam 26 to the first area 12 at the first incident angle $\alpha$. The hologram 10, thus, cannot be counterfeited easily.

The diffraction angles $\beta$ and $\gamma$ of the first diffractive beams 52 are related to the wavelength of the first laser beam 26. Therefore, a variation of the wavelength of the first laser beam 26 influences which sensing units 32 will be illuminated by the diffractive beams 52. In the embodiment, if the combination of the sensing units 32 illuminated by the diffractive beams 52 is changed, the output signal of the sensing device 30 is changed correspondingly. Therefore, even if a laser beam having a wavelength not equal to the wavelength of the first laser beam 26 is emitted to the first area 12 at the first incident angle $\alpha$, the sensing device 30 does not generate the first signal and the logic circuit 40 cannot detect the first hidden image on the hologram 10. The first hidden image, thus, must be detected by emitting the first laser beam 26 with a fixed first wavelength λ1 to the first area 12 at the first incident angle α. In other words, when a laser beam having a wavelength not equal to the first wavelength λ1 is emitted to the first area 12 at the first incident angle α, the sensing device 30 does not generate the first signal so that the present first hidden image cannot be analyzed or verified by the logic circuit 40.

Please refer to FIG. 1. The apparatus further comprises a second laser device 24 for generating a second laser beam 28 and projecting the second laser beam 28 to the hologram 10. A second hidden image (not shown) is formed in a second area 14 of the hologram 10. The second laser beam 28 is used to illuminate the second area 14 for detection of the second hidden image. Similar to the operations for detecting the first hidden image on the first area 12, the second laser beam 32 must be emitted to the second area 14 at a second incident angle θ and the wavelength of the second laser beam 32 must be equal to a fixed second wavelength λ2, otherwise the second hidden image cannot be detected.

In other words, when the second laser beam 28 is emitted to the second area 14 at the second incident angle θ, at least a second diffractive beam 54 is generated by diffraction of the second laser beam 28. The sensing device 30, thus, can generate a second signal according to characteristics of the second diffractive beam 54. But if the second laser beam 28 is emitted to the second area 14 at an incident angle that is not equal to the second incident angle θ, the second diffractive beams 54 cannot be generated and the sensing device 30 does not generate the second signal. Moreover, when a laser beam having a wavelength not equal to the second wavelength λ2 is emitted to the second area 14 at the second incident angle θ, the sensing device 30 does not generate the second signal.

Therefore, the present invention discloses a method and an apparatus thereof for double-verifying the hologram 10 by detecting the first hidden image and the second hidden image. The manufacturer of the hologram 10 can form the two hidden images in the hologram 10 in advance, and then the apparatus 1 can be used for anti-counterfeit and identification purposes by detecting the two hidden images.

In contrast to the prior art, the present invention provides an apparatus and a method thereof to determine whether a hologram comprises a hidden image, where the hidden image must be detected by a specific condition, i.e. a predetermined wavelength of a laser beam and a predetermined incident angle. The hologram according to the present invention, thus, is difficult to counterfeit. Moreover, the disclosed method and apparatus can be used for identification purposes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for detecting a first hidden image formed in a first area of a hologram, comprising:
   a first laser device for generating a first laser beam and projecting the first laser beam to the hologram; and
   a sensing device for sensing light that reflects from the hologram;
   wherein when the first laser beam is emitted to the first area at a first incident angle, at least a first diffractive beam is generated biffraction of the first laser beam and the sensing device generates a first signal according to characteristics of the first diffractive beam, when the first laser beam is emitted to the first area at an incident angle that is not equal to the first incident angle, the first diffractive beam cannot be generated and the sensing device does not generate the first signal.

2. The apparatus of claim 1 wherein the first laser beam has a first wavelength, when a laser beam having a wavelength not equal to the first wavelength is emitted to the first area at the first incident angle, the sensing device does not generate the first signal.

3. The apparatus of claim 1 further comprising a logic circuit electrically connected to the sensing device for analyzing the first signal to determine whether the first hidden image agrees with a predetermined standard.

4. The apparatus of claim 1 further comprising a second laser device for generating a second laser beam and projecting the second laser beam to the hologram, there being a second hidden image formed in a second area of the hologram, wherein when the second laser beam is emitted to the second area at a second incident angle, at least a second diffractive beam is generated by diffraction of the second laser beam and the sensing device generates a second signal according to characteristics of the second diffractive beam, when the second laser beam is emitted to the second area at an incident angle that is not equal to the second incident angle, the second diffractive beam cannot be generated and the sensing device does not generate the second signal.

5. The apparatus of claim 4 wherein the second laser beam has a second wavelength, when a laser beam having a wavelength not equal to the second wavelength is emitted to the second area at the second incident angle, the sensing device does not generate the second signal.

6. The apparatus of claim 4 further comprising a logic circuit electrically connected to the sensing device for analyzing the first signal and the second signal to determine whether the first hidden image and the second hidden image agree with a predetermined standard.

7. A method for detecting a first hidden image formed in a first area of a hologram by using a detection apparatus, the detection apparatus comprising a first laser device for generating a first laser beam and projecting the first laser beam to the hologram and a sensing device for sensing light that reflects from the hologram, the method comprising:
   projecting the first laser beam to the first area at a first incident angle so that at least a first diffractive beam is generated by diffraction of the first laser beam and that the sensing device generates a first signal according to characteristics of the first diffractive beam;
   wherein when the first laser beam is projected to the first area at an incident angle that is not equal to the first incident angle, the first diffractive beam cannot be generated and the sensing device does not generate the first signal.

8. The method of claim 7 wherein the first laser beam has a first wavelength, when a laser beam having a wavelength not equal to the first wavelength is emitted to the first area at the first incident angle, the sensing device does not generate the first signal.

9. The method of claim 7 wherein the detection apparatus further comprises a logic circuit electrically connected to the sensing device for analyzing the first signal to determine whether the first hidden image agrees with a predetermined standard.

10. The method of claim 7 wherein the detection apparatus further comprises a second laser device for generating a second laser beam and projecting the second laser beam to the hologram, there is a second hidden image formed in a second area of the hologram, the method further comprising:
projecting the second laser beam to the second area at a second incident angle so that at least a second diffractive beam is generated by diffraction of the second laser beam and that the sensing device generates a second signal according to characteristics of the second diffractive beam;
wherein when the second laser beam is projected to the second area at an incident angle that is not equal to the second incident angle, the second diffractive beam cannot be generated and the sensing device does not generate the second signal.

11. The method of claim 10 wherein the second laser beam has a second wavelength, when a laser beam having a wavelength not equal to the second wavelength is emitted to the second area at the second incident angle, the sensing device does not generate the second signal.

12. The method of claim 10 wherein the detection apparatus further comprises a logic circuit electrically connected to the sensing device for analyzing the first signal and the second signal so as to determine whether the first hidden image and the second hidden image agree with a predetermined standard.

* * * * *